(12) United States Patent
Kakatkar et al.

(10) Patent No.: US 10,992,555 B2
(45) Date of Patent: Apr. 27, 2021

(54) RECORDING, REPLAY, AND SHARING OF LIVE NETWORK MONITORING VIEWS

(75) Inventors: Kishor Kakatkar, Kothrud (IN); Roy Nakashima, San Jose, CA (US); Rosanna Lee, Palo Alto, CA (US); Jing Liu, Cupertino, CA (US); Derek Sanders, Saratoga, CA (US); Rangaswamy Jagannathan, Sunnyvale, CA (US); David Messina, Los Gatos, CA (US)

(73) Assignee: Virtual Instruments Worldwide, Inc., San Jose, CA (US)

( * ) Notice: Subject to any disclaimer, the term of this patent is extended or adjusted under 35 U.S.C. 154(b) by 0 days.

(21) Appl. No.: 12/791,704

(22) Filed: Jun. 1, 2010

(65) Prior Publication Data
US 2021/0067426 A1 Mar. 4, 2021

Related U.S. Application Data

(60) Provisional application No. 61/182,242, filed on May 29, 2009.

(51) Int. Cl.
*H04L 12/26* (2006.01)
*H04L 12/24* (2006.01)
*G06F 3/048* (2013.01)

(52) U.S. Cl.
CPC ............ *H04L 43/045* (2013.01); *H04L 41/22* (2013.01); *G06F 3/048* (2013.01); *H04L 43/00* (2013.01)

(58) Field of Classification Search
CPC . H04L 12/26; H04L 12/2689; H04L 12/2602; H04L 29/08099; H04L 41/14; H04L 43/12; H04L 67/025; H04L 67/22; H04L 67/28; H04L 69/00; H04L 43/045; H04L 41/22; H04N 21/2187;
(Continued)

(56) References Cited

U.S. PATENT DOCUMENTS 5,128,871 A 7/1992 Schmitz
5,233,604 A 8/1993 Ahmadi et al.
(Continued)

OTHER PUBLICATIONS

Deering et al. "RFC1883", Internet Protocol Specification, Dec. 1995, pp. 1-27, ver. 6, <http://www.faqs.org/rfcs/frc1883.html>.
(Continued)

*Primary Examiner* — John M Macilwinen
(74) *Attorney, Agent, or Firm* — Ahmann Kloke LLP

(57) ABSTRACT

Network monitoring views can be recorded, replayed and shared. A monitoring system receives monitoring data, in response to which a monitoring view can be constructed. The monitoring data is maintained in memory or mass storage. One or more monitoring views can later be constructed in response to user preferences, even if those users would not have known to select those particular preferences or construct those particular monitoring views at the time. The monitoring views constructed in response to that monitoring data can be presented to users in a simulation of the problem, as if it were occurring at that time. Users can send particular monitoring views to others, with both the effects that the monitoring view can be preserved as part of a trouble report, and the persons receiving the monitoring view can have useful insight into what problem the user has pointed to.

17 Claims, 4 Drawing Sheets

Figure 1:
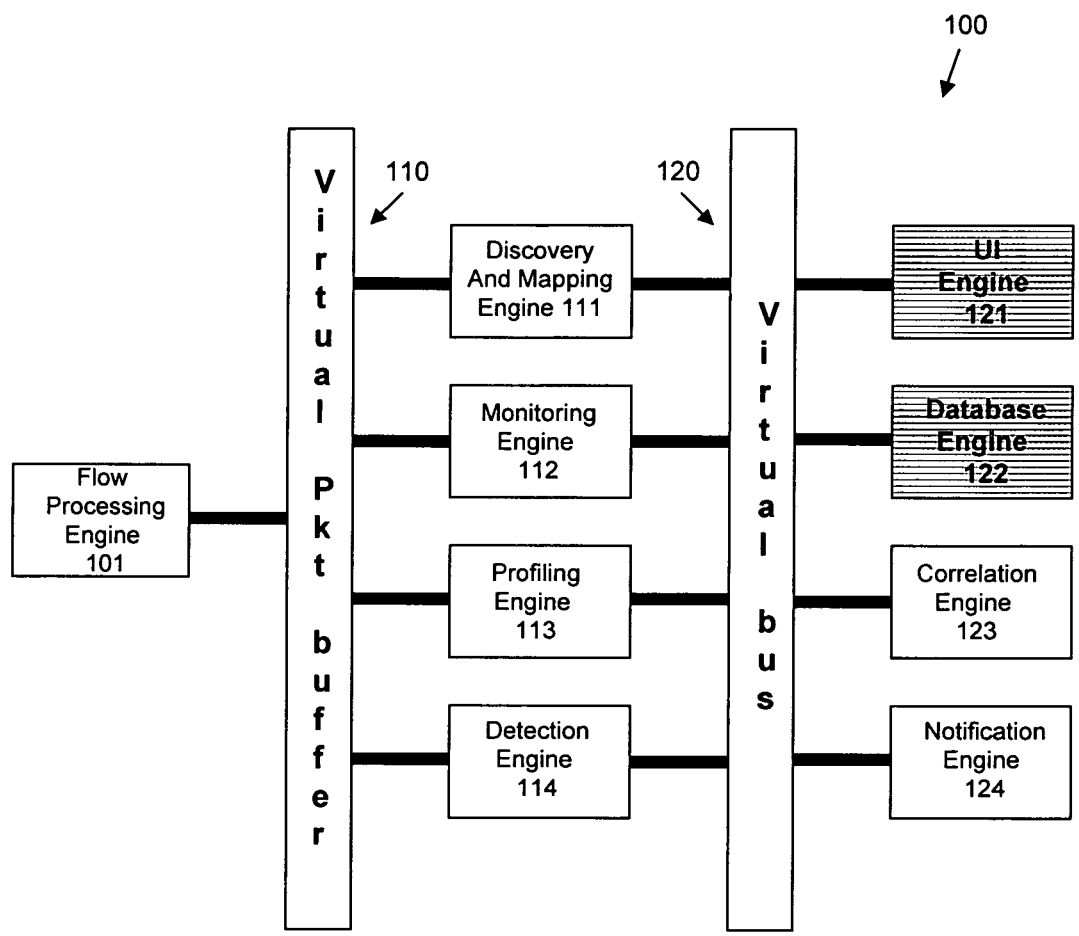

(58) Field of Classification Search
CPC .. H04N 21/647; H04M 7/0084; H04M 15/58; H04M 2215/0188; G06F 11/34; G06F 3/048
USPC ........ 715/700, 733–734, 736–738, 751, 748, 715/769, 770, 965–966, 969, 971; 709/223–226, 248
See application file for complete search history.

(56) References Cited

U.S. PATENT DOCUMENTS

| | | | |
|---|---|---|---|
| 5,271,038 A | 12/1993 | Cai | |
| 5,430,709 A | 7/1995 | Galloway | |
| 5,442,750 A | 8/1995 | Harriman, Jr. et al. | |
| 5,684,945 A * | 11/1997 | Chen et al. | 714/20 |
| 5,687,168 A | 11/1997 | Iwata | |
| 5,779,030 A | 7/1998 | Ikegami et al. | |
| 5,917,870 A | 6/1999 | Wolf | |
| 5,958,053 A | 9/1999 | Denker | |
| 5,970,064 A | 10/1999 | Clark et al. | |
| 5,991,881 A | 11/1999 | Conklin et al. | |
| 6,046,979 A | 4/2000 | Bauman | |
| 6,076,115 A | 6/2000 | Sambamurthy et al. | |
| 6,115,745 A | 9/2000 | Berstis et al. | |
| 6,128,296 A | 10/2000 | Daruwalla et al. | |
| 6,167,025 A | 12/2000 | Hsing et al. | |
| 6,189,035 B1 | 2/2001 | Lockhart et al. | |
| 6,202,084 B1 | 3/2001 | Kumar et al. | |
| 6,314,093 B1 | 11/2001 | Mann et al. | |
| 6,314,464 B1 | 11/2001 | Murata et al. | |
| 6,347,339 B1 | 2/2002 | Morris et al. | |
| 6,400,681 B1 | 6/2002 | Bertin et al. | |
| 6,502,135 B1 | 12/2002 | Minger et al. | |
| 6,529,866 B1 | 3/2003 | Cope et al. | |
| 6,611,525 B1 | 8/2003 | Natanson et al. | |
| 6,697,802 B2 * | 2/2004 | Ma | G06F 17/30595 |
| 6,725,377 B1 | 4/2004 | Kouznetsov | |
| 6,757,742 B1 | 6/2004 | Viswanath | |
| 6,785,237 B1 | 8/2004 | Sufleta | |
| 6,789,190 B1 | 9/2004 | Cohen | |
| 6,807,172 B1 | 10/2004 | Levenson et al. | |
| 6,816,910 B1 | 11/2004 | Ricciulli | |
| 6,930,978 B2 | 12/2005 | Sharp et al. | |
| 6,973,040 B1 | 12/2005 | Ricciulli | |
| 6,990,591 B1 | 1/2006 | Pearson | |
| 7,006,443 B2 | 2/2006 | Storr | |
| 7,007,301 B2 | 2/2006 | Crosbie et al. | |
| 7,013,482 B1 | 3/2006 | Krumel | |
| 7,051,369 B1 | 5/2006 | Baba | |
| 7,062,782 B1 | 6/2006 | Stone et al. | |
| 7,076,547 B1 | 7/2006 | Black | |
| 7,089,428 B2 | 8/2006 | Farley et al. | |
| 7,260,840 B2 | 8/2007 | Swander et al. | |
| 7,331,060 B1 | 2/2008 | Ricciulli | |
| 7,376,969 B1 * | 5/2008 | Njemanze | G06F 21/55 709/224 |
| 7,386,888 B2 | 6/2008 | Liang et al. | |
| 7,409,714 B2 | 8/2008 | Gupta et al. | |
| 7,461,403 B1 | 12/2008 | Libenzi et al. | |
| 7,506,046 B2 | 3/2009 | Rhodes | |
| 7,594,260 B2 | 9/2009 | Porras et al. | |
| 7,607,170 B2 | 10/2009 | Chesla | |
| 7,620,986 B1 | 11/2009 | Jagannathan et al. | |
| 7,702,563 B2 | 4/2010 | Balson et al. | |
| 7,895,320 B1 | 2/2011 | Oggerino et al. | |
| 7,941,135 B2 * | 5/2011 | Abusch-Magder | H04B 17/345 455/422.1 |
| 7,987,228 B2 * | 7/2011 | McKeown et al. | 709/202 |
| 8,738,761 B2 * | 5/2014 | Raisoni | H04L 43/12 709/203 |
| 9,716,638 B1 | 7/2017 | Sanders et al. | |
| 9,935,858 B1 | 4/2018 | Sanders et al. | |
| 10,009,237 B1 | 6/2018 | Sanders et al. | |
| 2001/0049711 A1 | 12/2001 | Nishihara | |
| 2001/0052087 A1 | 12/2001 | Garg et al. | |
| 2002/0052967 A1 | 5/2002 | Goldhor et al. | |
| 2002/0131413 A1 | 9/2002 | Tsao et al. | |
| 2002/0152284 A1 * | 10/2002 | Cambray | H04L 41/142 709/218 |
| 2002/0164999 A1 | 11/2002 | Johnson | |
| 2003/0202471 A1 | 10/2003 | Murooka et al. | |
| 2003/0229485 A1 | 12/2003 | Nishikawa et al. | |
| 2003/0229692 A1 | 12/2003 | Vo | |
| 2004/0052209 A1 | 3/2004 | Ortiz | |
| 2004/0054925 A1 | 3/2004 | Etheridge et al. | |
| 2004/0064293 A1 * | 4/2004 | Hamilton et al. | 702/182 |
| 2004/0111358 A1 | 6/2004 | Lange et al. | |
| 2004/0117769 A1 * | 6/2004 | Lauzon et al. | 717/125 |
| 2005/0099983 A1 | 5/2005 | Nakamura et al. | |
| 2005/0171960 A1 | 8/2005 | Lomet | |
| 2005/0190695 A1 | 9/2005 | Phaal et al. | |
| 2005/0213504 A1 | 9/2005 | Enomoto et al. | |
| 2005/0276230 A1 | 12/2005 | Akahane et al. | |
| 2005/0278779 A1 | 12/2005 | Koppol et al. | |
| 2006/0059282 A1 | 3/2006 | Chaudhary et al. | |
| 2006/0077905 A1 | 4/2006 | Russell et al. | |
| 2006/0077981 A1 | 4/2006 | Rogers | |
| 2006/0109793 A1 * | 5/2006 | Kim | H04L 41/145 370/250 |
| 2006/0195896 A1 | 8/2006 | Fulp et al. | |
| 2006/0272018 A1 | 11/2006 | Fouant et al. | |
| 2007/0014248 A1 * | 1/2007 | Fowlow | H04L 41/0856 370/254 |
| 2007/0019557 A1 * | 1/2007 | Catter | H04L 12/2801 370/242 |
| 2007/0156919 A1 | 7/2007 | Potti et al. | |
| 2007/0195787 A1 | 8/2007 | Alnuweiri et al. | |
| 2007/0211645 A1 | 9/2007 | Tachibana et al. | |
| 2007/0211697 A1 | 9/2007 | Noble | |
| 2007/0237079 A1 | 10/2007 | Whitehead | |
| 2007/0245015 A1 * | 10/2007 | Raisoni | H04L 43/12 709/224 |
| 2007/0245051 A1 | 10/2007 | Raisoni et al. | |
| 2007/0248029 A1 | 10/2007 | Merkey et al. | |
| 2007/0271374 A1 | 11/2007 | Shomura et al. | |
| 2008/0046104 A1 * | 2/2008 | Van Camp | G05B 15/02 700/90 |
| 2008/0049628 A1 * | 2/2008 | Bugenhagen | 370/244 |
| 2008/0049639 A1 * | 2/2008 | Wiley et al. | 370/252 |
| 2008/0049748 A1 * | 2/2008 | Bugenhagen et al. | 370/389 |
| 2008/0052387 A1 * | 2/2008 | Heinz et al. | 709/223 |
| 2008/0219267 A1 | 9/2008 | Xia et al. | |
| 2008/0225746 A1 * | 9/2008 | Bedrosian | H04L 43/50 370/252 |
| 2008/0291915 A1 | 11/2008 | Foschiano | |
| 2009/0046664 A1 | 2/2009 | Aso | |
| 2009/0182953 A1 * | 7/2009 | Merkey et al. | 711/136 |
| 2010/0135180 A1 | 6/2010 | Morinaga et al. | |
| 2010/0309812 A1 * | 12/2010 | Galan Marquez et al. | 370/254 |
| 2011/0040706 A1 | 2/2011 | Sen et al. | |
| 2011/0060831 A1 | 3/2011 | Ishii et al. | |
| 2011/0250883 A1 * | 10/2011 | Pyhtila et al. | 455/424 |

OTHER PUBLICATIONS

Steinke "IP Addresses and Subnet Masks," Network Magazine, Oct. 1995, pp. 1-3, Tables 1 and 3, <hppt://www.networkmagazine.com/shared/printableArticle.jhtml?articleID=17601068>.

* cited by examiner

RECORDING, REPLAY, AND SHARING OF LIVE NETWORK MONITORING VIEWS

This application names the following inventors:

| Inventor | Citizenship | Residence City and State |
| --- | --- | --- |
| Kishor KAKATKAR | United States | Kothrud, INDIA |
| Roy NAKASHIMA | United States | Cupertino, California |
| Rosanna K. LEE | United States | Palo Alto, California |
| Jing LIU | United States | Cupertino, California |
| Derek A. SANDERS | United States | Saratoga, California |
| Rangaswamy JAGANNATHAN | Canada | Sunnyvale, California |
| David MESSINA | United States | Cupertino, California |

This application names the following assignee: Xangati, a business having an office in Cupertino, Calif.

RELATED APPLICATION

This application claims priority from U.S. Provisional Application No. 61/182,242, filed May 29, 2009, entitled "Recording, Replay, and Sharing of Live Network Monitoring Views," in the name of Kishor Kakatkar, Roy Nakashima, Rosanna K. Lee, Jing Liu, Derek A. Sanders, Rangaswamy Jagannathan, and David Messina.

INCORPORATED DISCLOSURES

This patent application is intended to be read with the following documents:
- U.S. Provisional Application No. 61/182,242, filed May 29, 2009, entitled "Recording, Replay, and Sharing of Live Network Monitoring Views," in the name of Kishor Kakatkar, Roy Nakashima, Rosanna K. Lee, Jing Liu, Derek A. Sanders, Rangaswamy Jagannathan, and David Messina, including the Technical Appendix thereto.
- U.S. patent application Ser. No. 11/153,217, filed Jun. 14, 2005, entitled "Defenses Against Software Attacks in Distributed Computing Environments," in the names of Jagan Jagannathan and Rangaswamy Vasudevan;
- U.S. patent application Ser. No. 12/179,703, filed Jul. 25, 2008, entitled "Parallel Distributed Network Monitoring," in the names of Rangaswamy Jagannathan, Rosanna Lee, Derek Sanders, Kishor Kakatkar and Xiaohong Pan;
- U.S. patent application Ser. No. 12/180,193, filed Jul. 25, 2008, entitled "Network Monitoring Using Virtual Packets," in the names of Rosanna Lee, Xiaohong Pan, Rangaswamy Jagannathan, Derek Sanders, and Kishor Kakatkar;
- U.S. patent application Ser. No. 12/180,333, filed Jul. 25, 2008, entitled "Network Monitoring Using Bounded Memory Data Structures," in the names of Rosanna Lee, Xiaohong Pan, Rangaswamy Jagannathan, Derek Sanders, and Kishor Kakatkar;
- U.S. patent application Ser. No. 12/180,243, filed Jul. 25, 2008, entitled "Network Monitoring of Behavior Probability Density," in the names of Derek Sanders, Rangaswamy Jagannathan, Rosanna Lee, Kishor Kakatkar, Xiaohong Pan, and Jing Liu; and
- U.S. patent application Ser. No. 12/180,437, filed Jul. 25, 2008, entitled "Symptom Detection Using Behavior Probability Density," in the names of Derek Sanders, Rangaswamy Jagannathan, Rosanna Lee, Kishor Kakatkar, and Xiaohong Pan.

Each and every one of these documents including all drawings, figures, and subparts, is hereby incorporated by reference as if fully set forth herein. These documents are sometimes referred to herein, either as an entire set or a subset thereof, as the "Incorporated Disclosure" or "Incorporated Disclosures."

BACKGROUND

Monitoring of network data tells network administrators how the network is operating, and whether there are network problems which should be addressed. Network problems should be identified almost immediately as they happen, so that network administrators can take appropriate action. For example, some network problems might indicate that the network has been infected with a virus, is under a denial-of-service attack, or is suffering from other (e.g., non-security-related) reasons, for example and without limitation, that a network communication link has failed or degraded, or that a network endpoint has failed or degraded. Known systems sometimes alert network administrators when a network problem is detected. For example and without limitation, a network administrators might be alerted using direct communication, such as by email or pager, by using network management systems, such as by using a network management system, e.g., a system log or a selected set of SNMP traps. While these known systems generally achieve the purpose of providing a rapid alert, the alerted network administrators then work with a network problem that has already occurred, rather than one which is occurring while the network administrators are able to watch it unfold.

SUMMARY OF THE DESCRIPTION

A set of techniques provides methods by which live network monitoring views can be recorded, replayed and shared. A network monitoring system receives network monitoring data, in response to which a network monitoring view can be constructed. The network monitoring data is maintained in memory or mass storage, with the effect that one or more network monitoring views can later be constructed in response to user preferences, even if those users would not have known to select those particular preferences or construct those particular network monitoring views at the time.

The network monitoring views constructed in response to that network monitoring data can be presented to users in a simulation of the network problem, as if it were occurring at that time, with the effect that users can visualize and trouble-shoot operation of network problems even if those users were not present at the time those network problems occurred. This might be thought of as a recorded video stream, such as presentable on YouTube or a similar service, except that these views are far more versatile, in that they are dynamically adjustable (and in response to parameters which might not have been thought of at the time the video stream was recorded), and are presented as if they were occurring "live" for the user, e.g., a network administrator. Users can send particular network monitoring views to others, with both the effects that (1) the network monitoring view can be preserved as part of a trouble report, and (2) the persons receiving the network monitoring view can have useful insight into what problem the user has pointed to. After reading this application, those skilled in the art would appreciate that these effects would allow a network administrator to view (and repeatedly re-view) the network problem "as if" it were occurring in real time. For example and without limitation, these re-views "as if" they were occurring in real time would allow a network administrator to gain significant insight into whatever problem there might have been, by repeatedly examining the problem as it unfolds in "real time" and watching for particular types of features or symptoms, which might be associated with particular types of network problem.

DETAILED DESCRIPTION

Definitions

The following definitions are generally applicable herein:

The terms "client" and "server", and the like, generally refer to any client-server relationship between devices or applications. Thus, as used herein, one "client" or one "server" can comprise any of the following: (a) a single physical device capable of executing software; (b) a portion of a physical device, such as a software process or set of software processes capable of executing on one hardware device; or (c) a plurality of physical devices, or portions thereof, capable of cooperating to form a logical entity.

The phrase "formatting schema", and the like, generally refers to any specification for presentation of network monitoring data, including without limitation any specification with respect to the data selected for presentation, the aggregation or other collection of that data for presentation, and the method of comparison of that data with other network monitoring data.

The phrases "live network monitoring view", "network monitoring view", "monitoring view", and the like, generally refer to any presentation (whether the actual presentation, a recording, or a specification of how to make that presentation) of network monitoring data to a user. For example and without limitation, a monitoring view might include a time-varying presentation of one or more time series of data regarding network operation.

The phrase "network application", and the like, and the term "application", and the like, generally refer to any program, process, or operation that one endpoint might perform in association with interacting with another endpoint. For a first example and without limitation, IM (instant messaging) might be performed by both sender and receiver as an application both are using. For a second example and without limitation, HTTPS (hypertext transfer protocol, secure) might be performed by a client device and a server device as an application. The first example is substantially symmetric, in that each participant both sends information to the other and receives (and presents to a user) information from the other. However, the second example is substantially asymmetric, in that one participant is the client, which makes requests, and that one participant is the server, which services those requests. In the case of HTTPS, and its variants, the client primarily asks for particular information and the server supplies that information.

The phrase "network endpoint", and the like, and the term "endpoint", and the like, generally refer to anything in the environment associated with the network that is specifically addressable, and which interacts with other endpoints by the exchange of messages or data. For example and without limitation, an endpoint might include any device (such as a printer) with an IP (internet protocol) address and capable of receiving messages from other endpoints. In this example, a printer might receive messages from other endpoints regarding data (or pointers to data) to be printed.

The phrases "network monitoring data", "monitoring data", and the like, generally refer to any set of information regarding the state, changing state, or operation of a network. For example and without limitation, monitoring data might include one or more measures of network traffic, one or more measures of user activity with the network, and otherwise.

The terms "produce" and "consume", and the like, when referring to network applications, generally refer to any operation which causes a program, process, or operation to be instantiated, performed, or started, at one or more endpoints.

The phrases "simulation of live monitoring", and the like, "simulation of live data", and the like, generally refer to any presentation which resembles a presentation at the time or time epoch of original occurrence, or which resembles a presentation that would have been made, if requested, at the time or time epoch of original occurrence. For example and without limitation, a time-shifted presentation of network monitoring data, even if that network monitoring data were selected in response to information not available at the time or time epoch of the original occurrence, would be an example of a simulation of live monitoring.

The phrase "time-shifted", and the like, generally refers to any operation or presentation which is performed, or re-performed, at a time or during a time epoch other than the original time or time epoch when that operation or presentation was first performed. For example and without limitation, presentation of data relating to network traffic, substantially as if presented at the time of original occurrence, would be time-shifted with respect to the original occurrence of that network traffic.

These definitions should be regarded as exemplary and not in any way limiting.

FIGURES AND TEXT

FIG. 1 shows a conceptual diagram of a system.

A system 100 includes elements as shown in the FIG. 1, including a flow processing engine 101, a virtual packet buffer no, a discovery and mapping engine 11, a monitoring engine 112, a profiling engine 113, a detection engine 114, a virtual bus 120, a UI engine 121, a database engine 122, a correlation engine 123, and a notification engine 124.

The system 100 operates as described in the Incorporated Disclosure, which describes in further and other detail at least the operation of these elements. In particular, the Incorporated Disclosure describes in further and other detail multiple phases of operation of the system 100.

In particular, the Incorporated Disclosure describes in further and other detail, at least the following:

how the flow processing engine 101 receives monitoring information;

how the virtual packet buffer 110 segregates that monitoring information into virtual packets having a (simulated) relatively uniform time spacing;

how the discovery and mapping engine in discovers IP addresses, application ports, subnets, interfaces and performance probes, in response to monitoring information;

how the discovery and mapping engine 111 maps those IP addresses to endpoints, those application ports to applications, those subnets to locations, and those interfaces to flow interfaces;

how the monitoring engine 112 reports bandwidth plots and other useful information relating to selected endpoints, applications, locations, and flow interfaces;

how the profiling engine 113 and detection engine 114 provide detection of symptoms associated with endpoints, in response to the monitoring engine 112;

how the virtual bus 120 gathers and distributes information between and among elements of the system 100;

how the correlation engine 123 correlates symptoms to infer events and to manage those actions of discovery, profiling, and correlation; and how the notification engine 124 informs network personnel of substantially important information.

The UI engine 121 and the database engine 122 provide network personnel for live viewing and recording, and later playback and sharing, of information relating to the operation of the system 100. For example and without limitation, such information might include recordings of endpoints, applications, locations, and flow interfaces, as well as applicable pairs or triplets thereof. After reading this application, those skilled in the art will note that the information maintained by the database engine 122 is sufficient to replay, as if "live", system problems as if they were occurring, and with the added feature of being able to review particular endpoints (and the like), and pairs and triplets thereof, during the replay of those system problems, even though network personnel might not have thought to include presentation of that information, or might not have had access to that information, at the time of the original system problem. Thus, the system 100 provides not just the ability to view and record system operation, but also provides the ability to enhance those recordings of system operation with then-current information that was not, in fact, then-available to network personnel.

FIG. 2

Figure 2:
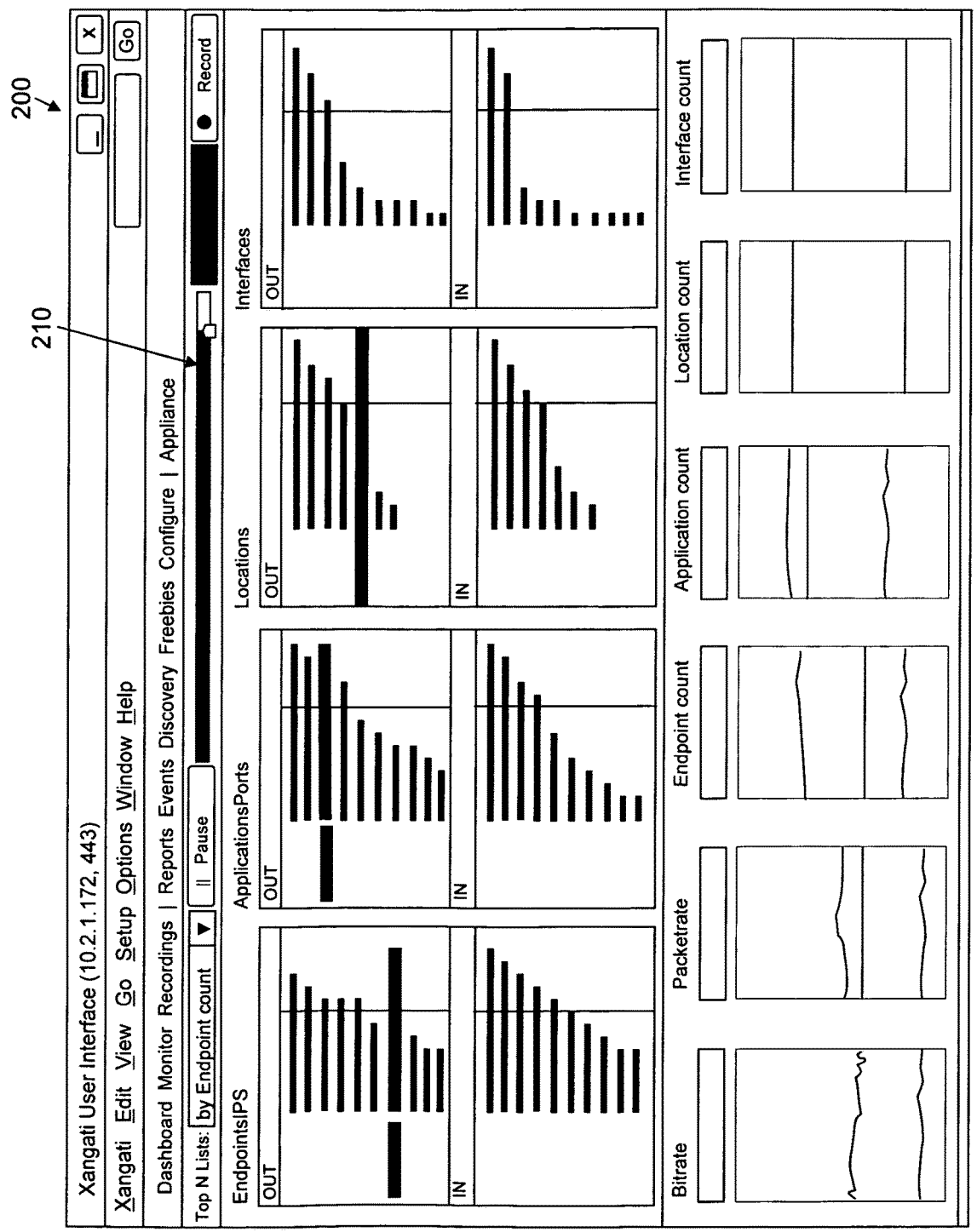

FIG. 2 shows a conceptual diagram of a portion of a user interface.

A user interface 200 includes at least a network slider bar 210, which provides network personnel with the ability to pause, back up, replay, fast forward, and other functions, with respect to a network monitoring view, whether that network monitoring view is one relating to a current state of the system 100 or one relating to a past state of the system 100.

The user interface 200 also includes a set of (optionally multiple) views of information relating to the system 100. For example and without limitation, these views might include:

an "entire network view", including without limitation, substantially at least some of the following information: (1) a bi-directional view of a set of Top-N endpoints, applications, locations and interfaces that can be viewed by bandwidth, by related endpoints, by bandwidth change and by related endpoint change. In one embodiment, this information might be updated every 10 seconds; and (2) a set of information relating to bi-directional trends of endpoint count, application count, location count and interface count as well as bit-rate and packet-rate. In one embodiment, this information might be updated every second.

Figure 3A:
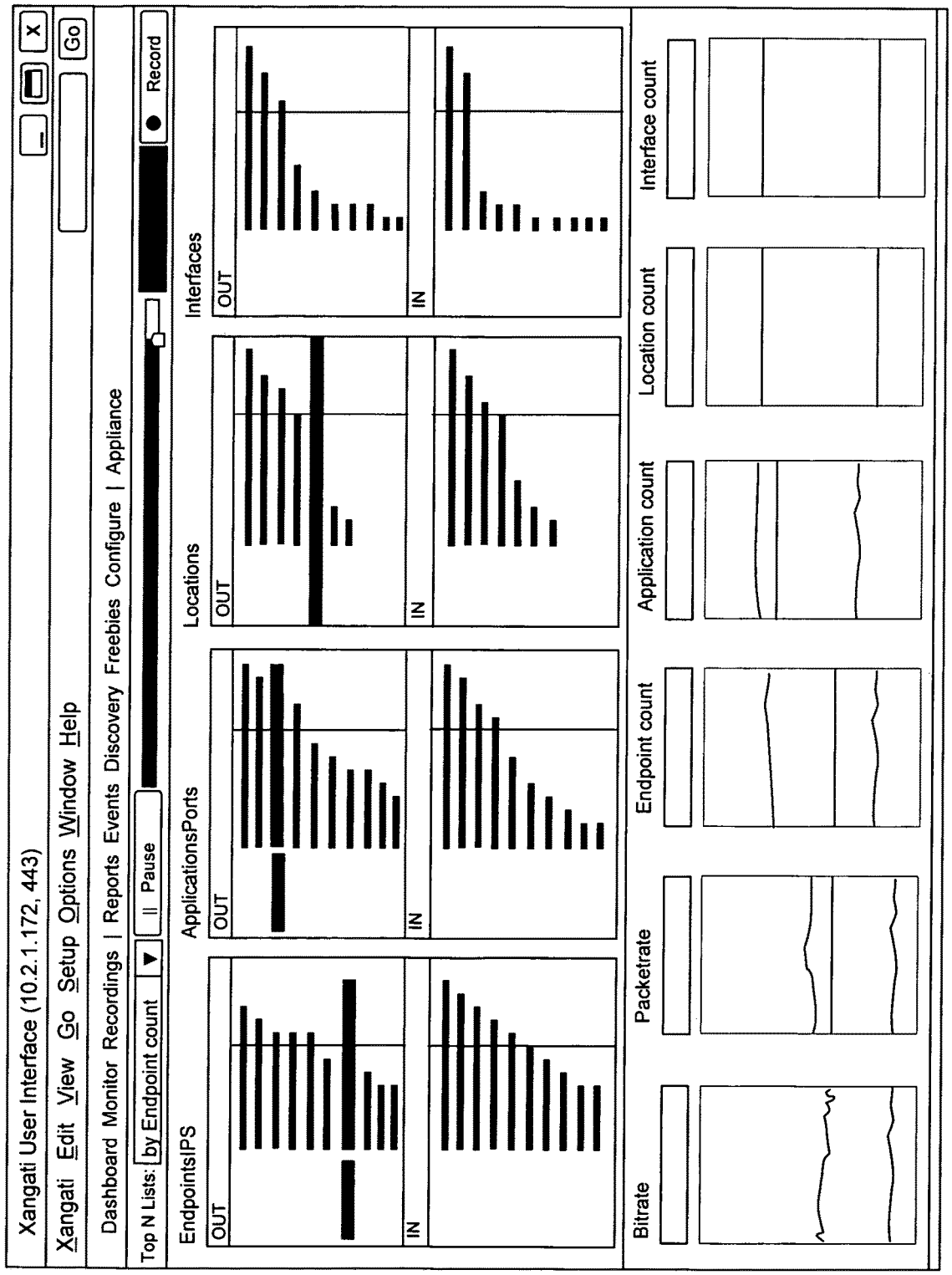
Figure 3B:
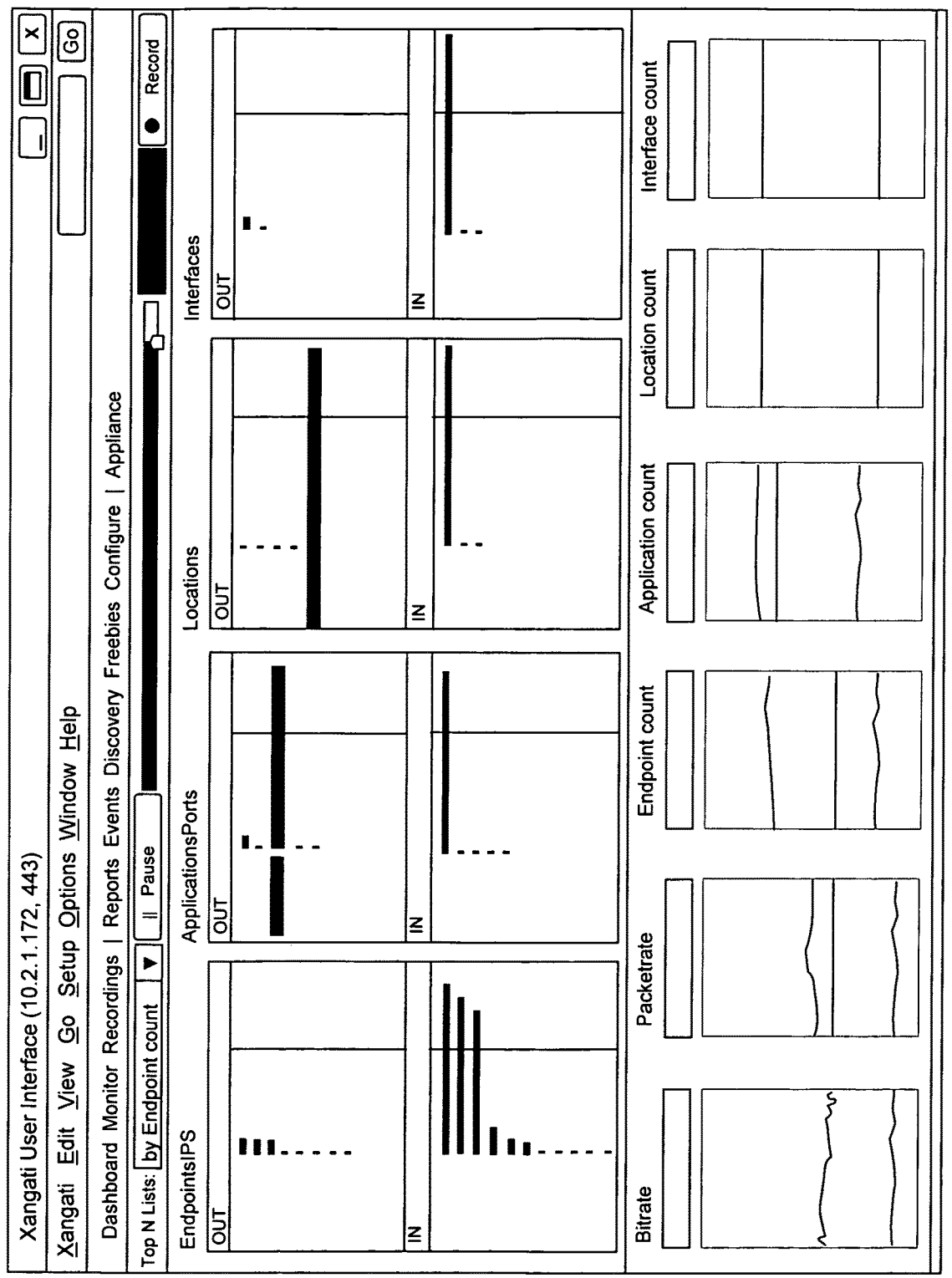

FIG. 3A and FIG. 3B show examples of an "entire network view".

For a first example and without limitation, data for the entire network view might be generated by the monitoring engine 112, published using the virtual bus 120, and consumed directly by the UI engine 121.

For a second example and without limitation, data for the entire network view might be generated by the monitoring engine 112, published using the virtual bus 120, and recorded by the database engine 122 for later use.

For a third example and without limitation, data for the entire network view might be generated by the monitoring engine 112, published using the virtual bus 120, and consumed by the correlation engine 123, such as to determine correlations of interest to network administrators.

For a fourth example and without limitation, data for the entire network view might be generated by the monitoring engine 112, published using the virtual bus 120, and consumed by the notification engine 124, which might itself make use of the UI engine 121 to present notifications to network administrators or other personnel.

The user interface 200 also includes a set of (optionally multiple) views of information relating to portions of the system 100, not equal to the entire system 100. For example and without limitation, these views might include:

an "object-specific view", including without limitation, substantially at least some of the information as described above with respect to the "entire network view", but limited to a selected object or set of objects;

a "pairwise context view", including without limitation, substantially at least some of the information as described above with respect to the "entire network view", but limited to a pair of objects;

a "multi-level context view", including without limitation, substantially at least some of the information as described above with respect to the "entire network view", but limited to a sets of objects considered as tuples, e.g., triplets of objects.

Further and other specific information that might be collected by the monitoring engine 112 is described in further and other detail in the Incorporated Disclosures, described below, and hereby incorporated by reference as if fully set forth herein.

Visual Trouble Tickets

As noted above, network monitoring views can be manipulated by network administrators (or other authorized personnel) using a network slider bar 210 (described above with respect to the FIG. 2). The network slider bar 210 provides network personnel with the ability to pause, back up, replay, fast forward, and other functions, with respect to a network monitoring view, whether that network monitoring view is one relating to a current state of the system 100 or one relating to a past state of the system 100.

When a user (or administrator, or other authorized personnel), identifies a problem, it might be desirable for that user to report the problem using a "trouble ticket", i.e., a report to network administrators of the existence of the problem, and some preferably detailed description of how the problem occurred and what the problem caused. In one embodiment, the user can send the associated network monitoring data, which thus identifies the problem using a "visual" trouble ticket. For example and without limitation, a "visual" trouble ticket might allow a recipient to re-view (possibly over and over) the problem as it occurred in "real time" (i.e., a simulation thereof), with the effect that users can visualize and trouble-shoot operation of the network "as if" the problem were unfolding before them in "real time".

Sharing Recordings

Similarly to visual trouble tickets, a user might find it desirable for to share a network monitoring view of a past state of the system, with the effect that a recipient would be able to re-view (possibly over and over) the past state as it occurred in "real time" (i.e., a simulation thereof), with the effect that users can visualize and trouble-shoot operation of the network "as if" the problem were unfolding before them in "real time".

For example and without limitation, a user or a recipient might have interest in one or more of, or some combination or conjunction of, the following:

a particular behavior of the network, which might or might not adequately adhere to a specification of the network approved by management;

a particular behavior of the network, which might or might not reflect the existence of a software anomaly or a software bug in network management;

a particular behavior of the network, which might be useful as evidence of behavior of the network during some past time epoch—for example and without limitation, the particular behavior of the network might be evidence of manipulation of the network by an unauthorized party;

a particular behavior of the network, which might be useful to identify a change in network behavior with addition (or deletion) of a selected feature or a selected software routine.

For example and without limitation, in each such case the user can send the associated network monitoring data, which thus identifies the problem in a way that might allow a recipient to replay the behavior of the network "as if" that behavior were occurring in "real time".

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

The invention is not limited to the specifics of any particular embodiments and examples disclosed herein. Many other variations are possible which remain within the content, scope and spirit of the invention, and these variations would become clear to those skilled in the art after perusal of this application.

Alternative Embodiments

After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. A method of monitoring network data, the method comprising:
   during a first period of time:
      receiving, in real-time, a set of network monitoring data from a plurality of endpoints of a network including one of a processing and storage device, the processing and storage device being capable of sending or receiving network traffic through the network;
      mapping the received set of network monitoring data to a plurality of entities of the network;
      presenting, in real-time, to a user, one or more monitoring views, the one or more monitoring views identifying a subset of the plurality of entities of the network and identifying changes in operation of the network based on the set of network monitoring data;
      analyzing, after presenting the one or more monitoring views during the first period of time, at least a subset of the set of network monitoring data;
      identifying an alarm condition based on analyzing the at least the subset of the set of network monitoring data, the alarm condition occurring at a particular time within the first period of time, the alarm condition not being indicated within the presentation;
   during a second period of time, the second period of time beginning after an end of the first period of time:
      receiving a request for a first simulation of the network using the at least the subset of the set of network monitoring data;
      simulating at least a portion of the first simulation of the network using the at least the subset of the set of network monitoring data and the first simulation including the alarm condition, the alarm condition being indicated during the first simulation when simulating the particular time within the first period of time; and
      presenting the at least the portion of the first simulation of the network, the presenting including the alarm condition when simulating the particular time within the first period of time.

2. The method as in claim 1, wherein the set of network monitoring data including measures of network traffic such as bit rate and packet rate of the network traffic.

3. The method as in claim 1, wherein parameters of the network include a bit rate of the network traffic, a packet rate of the network traffic, an interaction rate, and burstiness, the interaction rate being a measure of a particular endpoint of the network with other entities of the network, the burstiness being a measure of a rate of change of bit rate for the particular endpoint of the network.

4. The method as in claim 1, wherein the analyzing includes analyzing an exponential moving average of one or more parameters of the network.

5. The method as in claim 4, wherein the analyzing includes comparing the exponential moving average with user-defined thresholds.

6. The method as in claim 1, wherein the entities of the network include: endpoints of the network, an application of the network, a location of the network, or a flow interface of the network.

7. The method as in claim 1, wherein the identifying the alarm condition did not occur during the first period of time.

8. The method as in claim 1, wherein simulating the at least the portion of the first simulation includes simulating the alarm condition at a point in time where the alarm condition takes place as if the alarm condition was occurring in real-time.

9. A method, including steps of:
receiving, during a first period of time, a set of network monitoring data from a plurality of endpoints of a network including one of a processing and storage device, the processing and storage device being capable of sending or receiving network traffic through the network;
mapping the received set of network monitoring data to one or more entities of the network;
presenting, in real-time, one or more live network monitoring views, the one or more live network monitoring views identifying a subset of the one or more entities of the network and identifying changes in operation of the set of network monitoring data;
analyzing, after presenting the one or more live network monitoring views during the first period of time, at least a subset of the set of network monitoring data, the analyzing being based at least on maximum and minimum values of one or more parameters of the network;
identifying an alarm condition based on analyzing the at least the subset of the set of network monitoring data, the alarm condition occurring at a particular time within the first period of time, the alarm condition not being indicated within the presentation;
receiving, from a user during a second period of time, a request for a first simulation of the network using the at least the subset of the set of network monitoring data, the first simulation of the network including the one or more live network monitoring views, the second period of time beginning after an end of the first period of time;
simulating at least a portion of the first simulation of the network using the at least the subset of the set of network monitoring data and the first simulation including the alarm condition, the alarm condition being indicated during the first simulation when simulating the particular time within the first period of time;
presenting the at least the portion of the first simulation of the network, the presenting including the alarm condition when simulating the particular time within the first period of time;
receiving, during the presenting, an indication to change one or more parameters associated with a particular behavior of the network, the one or more parameters being associated with the alarm condition;
dynamically adjusting, in real-time, the first simulation, based on the indication to change the one or more parameters, the first simulation substituting the one or more parameters during the first simulation, a relationship of the particular behavior with the one or more parameters not having been computed during the first period of time; and
presenting, in real-time, the first simulation after the dynamic adjustment.

10. The method as in claim 9, wherein the set of network monitoring data includes measures of network traffic such as bit rate and packet rate of the network traffic.

11. The method as in claim 9, wherein the set of network monitoring data includes measures of network traffic such as bit rate and packet rate of the network traffic.

12. The method as in claim 9, wherein the parameters of the network include a bit rate of the network traffic, a packet rate of the network traffic, an interaction rate, and burstiness, the interaction rate being a measure of a particular endpoint of the network with other entities of the network, the burstiness being a measure of a rate of change of bit rate for the particular endpoint of the network.

13. The method as in claim 9, wherein the analyzing includes analyzing an exponential moving average of one or more parameters of the network.

14. The method as in claim 13, wherein the analyzing includes comparing the exponential moving average with user-defined thresholds.

15. The method as in claim 9, wherein the entities of the network include: endpoints of the network, an application of the network, a location of the network, or a flow interface of the network.

16. The method as in claim 9, wherein the identifying the alarm condition did not occur during the first period of time.

17. The method as in claim 9, wherein simulating the at least the portion of the first simulation includes simulating the alarm condition at a point in time where the alarm condition takes place as if the alarm condition was occurring in real-time.

* * * * *